Patented Aug. 15, 1950

2,518,495

UNITED STATES PATENT OFFICE 2,518,495

ROSIN ESTER REACTION PRODUCTS AND THE PROCESS OF MAKING SAME

John B. Rust, Montclair, N. J., assignor, by direct and mesne assignments, of one-half to Montclair Research Corporation, a corporation of New Jersey, and one-half to Ellis-Foster Company, a corporation of New Jersey No Drawing. Application March 15, 1946, Serial No. 654,795

17 Claims. (Cl. 260—27)

The present invention relates to modified rosin esters which are particularly adapted to the formulation of coating compositions. In particular it relates to reaction products of a rosin ester and a monohydric beta-unsaturated alcohol-gamma-delta unsaturated dicarboxylic acid ester.

It is an object of the invention to provide modified rosin esters which vary in hardness from brittle resins to soft, tough, rubber products which are compatible with nitrocellulose, soluble in drying oils and which may be made heat-convertible on proper formulation.

It is a further object of this invention to provide modified natural resins which accelerate the bodying of drying oils.

Another object of this invention is to make low-melting, heat-convertible resins which may be used as plasticizing components of nitrocellulose lacquers.

Another object of this invention is to make substantially neutral heat-hardenable derivatives of rosin esters.

Still further objects and advantages of the present invention will be obvious from the more detailed description set forth below, it being understood that this description is given by way of illustration and explanation only, and not of limitation, since various changes therein may be made by those skilled in the art without departing from the scope and spirit of the invention.

In my copending application Serial No. 534,531, filed May 6, 1944 now Patent No. 2,398,669, April 16, 1946, I have described and claimed co-reaction products of rosin esters and unsaturated alcohol esters of saturated polycarboxylic acids, such as diallyl phthalate. I have now found, and this is the subject of the present invention, that rosin esters can be reacted with unsaturated alcohol esters of gamma-delta unsaturated dicarboxylic acids, such as diallyl 1,2,3,6-tetrahydrophthalate to yield resinous reaction products which in general are harder than the resins obtained from the esters of saturated dicarboxylic acids but are more soluble in drying oils and also are more oil-reactive. Like the resins from the esters of saturated acids, the products are hydrolyzable by saponification to rosin compounds which probably are hydroxy acids, since the acid number of the water insoluble hydrolytic products is lowered by heating.

The process of the present invention comprises reacting the rosin or abietic acid esters of a monohydric or polyhydric alcohol (methyl alcohol, ethyl alcohol, glycerol, pentaerythritol, mannitol, sorbitol, glycol, polyglycol, trihydroxy-methyl aminomethane and the like) with a gamma-delta unsaturated dicarboxylic acid ester of an unsaturated monohydric alcohol containing from 3 to 4 carbon atoms. The latter esters include diallyl 1,2,3,6-tetrahydrophthalate, monoallyl tetrahydrophthalate, dimethallyl tetrahydrophthalate, monomethallyl tetrahydrophthalate, dicrotyl tetrahydrophthalate, monocrotyl tetrahydrophthalate, dipropargyl tetrahydrophthalate, monopropargyl tetrahydrophthalate, dibutenyl tetrahydrophthalate, monobutenyl tetrahydrophthalate and the like, or the above alcohol esters of such Diels-Alder products of conjugated dienes as cyclopentadiene, isoprene, butadiene, 2-methylpentadiene and the like, with alpha-beta unsaturated dicarboxylic acids such as maleic anhydride, fumaric acid, itaconic anhydride, citraconic anhydride and the like.

It has been found possible to co-react a rosin ester and the unsaturated alcohol ester (e. g., a diallyl ester) at relatively low temperatures of about 200–250° C. until a preliminary reaction is over. The rosin ester may be the rosin or abietic acid ester of any alcohol, monohydric or polyhydric and including mixed esters such as rosin phthalic glyceride. However, for the purpose of the present invention the ester is one which still retains the unsaturation characteristic of abietic acid. The preliminary reaction appears to be in the form of a partial reaction of the rosin ester and the allyl ester, followed by copolymerization of the preliminary reaction product with part of the allyl ester. After the preliminary reaction is over the temperature is raised to 275–300° C. in order to convert the modified rosin ester to the desired softening point. Thus, the reaction between the rosin ester and the other ester is carried out at a temperature from 200° C. to 300° C. Lower temperatures favor polymerization of the other ester and higher temperatures lead to decomposition and loss of reactants.

I may use the allyl ester in any proportion most suitable to bring about the desired degree of modification of the rosin ester to produce products which are completely soluble in lacquer solvents and also in drying oils. From 10% to 50% of the allyl gamma-delta unsaturated dicarboxylic acid ester will serve to bring about the desired degree of modification, although it is to be understood that these proportions may be varied over a considerably wider range. For instance, when the modified rosin ester contains less than 25% of the allyl ester, harder, more brittle products are obtained, and when 75% or more of the allyl ester is used, modified products are obtained which are tough and rubbery and which are soluble in certain solvents but insoluble in drying oils.

In another embodiment of the present invention a monoallyl ester such as monoallyl tetrahydrophthalate is heated with a rosin ester such as glycerol diabietate, or any other polyhydric alcohol ester formed from an excess of polyhydric alcohol, to give the interester-interreaction product. In this way a substantially neutral interesterified product may be made which contains less unsaturated alcohol than does the di-unsaturated alcohol ester-modified rosin ester. In some cases the latter procedure is preferred since only an unsaturated alcohol monoester is employed. Such unsaturated alcohol monoesters are easily prepared by mixing molecularly equivalent amounts of unsaturated alcohol and unsaturated gamma-delta dicarboxylic anhydride and heating for a short time to obtain the acid ester.

In another embodiment of the present invention, the Diels-Alder addition product of an unsaturated monohydric alcohol ester of an alpha-beta unsaturated dicarboxylic acid ester and a conjugated diolefin such as cyclopentadiene, butadiene, 2-methylpentadiene, isoprene and the like may be first prepared and this product reacted with the rosin ester in a manner heretofore explained.

In still another embodiment of the present invention, the Diels-Alder addition product of a monoester of an unsaturated monohydric alcohol and an alpha-beta unsaturated dicarboxylic acid ester and a conjugated diolefin may be first prepared and this product reacted with a rosin-polyhydric alcohol ester from an excess of polyhydric alcohol such as glyceryl diabietate.

I have found that it is possible to copolymerize the products of the present invention with polymerizable compounds such as styrene, methyl methacrylate, ethyl acrylate, vinyl acetate, indene, and the like. Thus I may first carry out the preliminary reaction between the rosin ester and the allyl ester, and then copolymerize with, for instance, vinyl acetate. Such copolymer resins are most useful in drying oil varnishes and nitrocellulose lacquers.

The resins of the present invention are preferably made without polymerization catalysts. However, the use of catalysts speeds up the initial reaction and also assists in completing the final polymerization.

The modified resins of the present invention may be put to a variety of uses as for instance in formulations of lacquers with nitrocellulose, varnishes with drying oils, etc. It is a particular object of this invention to produce oil-reactive, heat-advancing resins by the modification of rosin esters with unsaturated alcohol esters, these resins being capable of continued polymerization when they are heated with drying oils in the usual practice of making varnishes. The resins of the present invention may also be blended with other resins such as urea-formaldehyde resins, phenolaldehyde resins, melamine-formaldehyde resins, vinyl resins, methyl methacrylate polymer, vinylidene dichloride polymer, acrylate resins, cellulose derivatives, polyvinyl alcohol, and the like.

The following examples are given to illustrate the process and products of the present invention. All proportions are by weight.

*Example 1.*—127.5 parts of glycerol triabietate (ester gum) and 22.5 parts of the diallyl ester of cyclopentadienemaleic adduct (diallyl 3,6-endomethylene-1,2,3,6-tetrahydrophthalate) are heated together in a 3-neck flask equipped with a stirrer, thermometer, and air condenser, as follows:

20° C. to 250° C. in 2 hours, and
250° C. to 260° C. for 10 hours.

A light-colored clear resin is obtained which possesses an acid number of 5.5 and a ring and ball softening point of 113° C.

30 parts of the above resin and 60 parts of bodied linseed oil are heated together to 280° C. and held at 280–285° C. for 15 minutes. A light-colored clear varnish base is formed, which can be drawn into a string 15″ to 18″ in length when cold. It is thinned with 90 parts of VM and P naphtha to which is added 0.6% lead as lead naphthenate and 0.06% cobalt as cobalt naphthenate based upon the linseed oil. The resulting varnish air-dries to a dust-free film in 1¼ hours and is tack-free after 4½ hours. After air-drying for 24 hours the film is flexible and possesses a Sward rocker hardness of 59. A film of the varnish after air-drying for 24 hours softened somewhat when immersed in tap water for 24 hours but did not cloud.

*Example 2.*—120 parts of glycerol triabietate and 30 parts of the diallyl ester of cyclopentadiene-maleic adduct are heated together in a 3-neck flask equipped with a stirrer, thermometer, and air condenser as follows:

20° C. to 250° C. in 2 hours, and
250° C. to 260° C. for 11 hours.

A light-colored, clear resin is produced which possesses an acid number of 4.9 and a ring and ball softening point of 117° C.

30 parts of the above resin and 60 parts of bodied linseed oil are heated together to 280° C. and held at 280–285° C. for 12 minutes. A light-colored clear varnish base is secured which could be drawn into a string 15″–18″ in length when cold. It is thinned with 90 parts of VM and P naphtha to which is added 0.6% lead as lead naphthenate and 0.06% cobalt as cobalt naphthenate based upon the linseed oil. The resulting varnish air-dries to a dust-free film in 1¼ hours and is tack-free after 4¾ hours. After air-drying for 24 hours the film is flexible and possesses a Sward rocker hardness of 53. A film of the varnish after air-drying for 24 hours clouds slightly when immersed in tap water for 24 hours.

*Example 3.*—120 parts of glyceryl triabietate and 60 parts of the diallyl ester of cyclopentadiene-maleic adduct are heated together in a 3-neck flask equipped with a stirrer, thermometer, and air condenser, as follows:

20° C. to 200° C. in 1 hour,
200° C. to 240° C. for 3 hours, and
240° C. to 260° C. for 4 hours.

A light-colored clear resin is obtained which possesses an acid number of 13 and a ring and ball softening point of 107° C.

*Example 4.*—120 parts of pentaerythrityl tetra-abietate (Pentalyn G) and 30 parts of the diallyl ester of cycylopentadiene-maleic adduct are heated together in a 3-neck flask equipped with a stirrer, thermometer, and air condenser, as follows:

20° C. to 200° C. in 1 hour,
200° C. to 240° C. for 3 hours,
240° C. to 260° C. for 3 hours.

A light-colored clear resin is obtained which possesses an acid number of 14 and a ring and ball softening point of 121° C.

*Example 5.*—105 parts of glyceryl triabietate and 45 parts of the diallyl ester of butadiene-maleic adduct (diallyl 1,2,3,6-tetrahydrophthalate are heated together in a 3-neck flask equipped with a stirrer, thermometer, and air condenser, as follows:

20° C. to 200° C. in 1 hour,
200° C. to 250° C. for 2 hours, and
250° C. to 300° C. in 3 hours.

A light-colored clear resin is formed which possesses an acid number of 17 and a ring and ball softening point of 116° C.

*Example 6.*—105 parts of glycerol triabietate and 45 parts of the diallyl ester of an isoprene-maleic adduct are heated together in a 3-neck flask equipped with a stirrer, thermometer, and air condenser, as follows:

20° C. to 200° C. in 1 hour,
200° C. to 250° C. in 1 hour, and
250° C. to 300° C. for 5 hours.

A light-colored resin is formed which possesses an acid number of 19 and a ring and ball softening point of 112° C.

*Example 7.*—120 parts of glyceryl triabietate and 30 parts of the adduct, formed by heating together 19.6 parts of diallyl fumerate and 6.6 parts of freshly distilled cyclopentadiene, are heated together in a 3-neck flask equipped with a stirrer, thermometer, and air condenser, as follows:

20° C. to 250° C. in 2 hours, and
250° C. to 260° C. for 6 hours.

A light-colored clear resin is secured which possesses an acid number of 5.5 and a ring and ball softening point of 120° C.

30 parts of the above resin and 60 parts of bodied linseed oil are heated together to 280° C. and held at 280–290° C. for 16 minutes. A clear, light-colored varnish base is secured which can be drawn into a string 15″ to 18″ in length. It is thinned with 90 parts of VM and P naphtha, and 0.6% lead as lead naphthenate and 0.06% cobalt as cobalt naphthenate added based on the linseed oil. The resulting varnish air-dries to a dust-free film in 1 hour and is tack-free after 5 hours. After air-drying for 24 hours the film is flexible and possesses a Sward rocker hardness of 65.

*Example 8.*—120 parts of WW rosin, and 18.4 parts of glycerol are heated together in a 3-neck flask equipped with a thermometer, stirrer, and air condenser at 240–250° C. for 4½ hours to form a glycerol diabietate. 45.6 parts of the monomethallyl alcohol ester of cyclopentadiene-maleic adduct are added and heating continued at 220–240° C. for an additional 6 hours. A light-colored clear resin is produced which possesses an acid number of 31.7 and a ring and ball softening point of 117° C.

*Example 9.*—120 parts of WW rosin and 18.4 parts of glycerol are heated together in a 3-neck flask equipped with a thermometer, stirrer, and air condenser at 240–250° C. for 4½ hours. 42.5 parts of the monoallyl alcohol ester of cyclopentadiene-maleic adduct are added and heating continued at 220–240° C. for an additional 6½ hours. A light-colored clear resin is secured which possesses an acid number of 29.3 and a ring and ball softening point of 121° C.

*Example 10.*—120 parts of WW rosin and 19.3 parts of technical grade pentaerythritol are heated together in a 3-neck flask equipped with a thermometer, stirrer, and air condenser at 240–250° C. for 4½ hours to produce a pentaerythritol triabietate. 28.3 parts of the adduct formed by reacting 31.2 parts of monoallyl maleate and 13.2 parts of cyclopentadiene are then added and heating continued at 200–220° C. for 6¼ hours. A light-colored resin is formed which possesses an acid number of 24.1 and a ring and ball softening point of 112° C.

30 parts of the above resin and 60 parts of bodied linseed oil are heated together to 280° C. and this temperature maintained for 15 minutes. A light-colored varnish base is secured which could be drawn into a string 15″–18″ in length. It is thinned with 90 parts of VM and P naphtha to which is added 0.6% lead as lead naphthenate and 0.06% cobalt as cobalt naphthenate as driers. The varnsh air-dries to a dust-free film in 1¼ hours and is tack-free after 5¾ hours. The varnish after air-drying for 24 hours possesses a Sward rocker hardness of 47. A film of the varnish after air-drying for 24 hours clouds slightly when immersed in tap water for 24 hours.

The products of the present invention consist of soluble resinous interreaction products of a rosin ester and an unsaturated alcohol ester of a gamma-delta unsaturated dicarboxylic acid. This process, therefore, is one of bringing together a rosin ester and one or more of the above mentioned allyl esters under conditions of temperature such that a preliminary reaction product is initially secured, as indicated by the formation of a clear resinous bead when cold, followed by further heating at 200–300° C. to cause polymerization of the preliminary product to such a degree that soluble resinous products are obtained which are useful in nitrocellulose lacquers and drying oil varnishes.

The products of the present invention are soluble in esters, ketones, hydrocarbons, chlorinated hydrocarbons, glycol ethers, nitropropane, and insoluble in ethylene glycol and ethyl alcohol.

Having thus set forth my invention, I claim:

1. The process of making a soluble resinous reaction product which comprises heating, at between 200° C. and 300° C., an abietic acid ester, with from 10% to 75% of an ester of a conjugated diene alpha-beta olefinic dicarboxylic acid adduct and a beta-unsaturated monohydric alcohol containing from 3 to 4 carbon atoms.

2. The process of making a soluble resinous reaction product which comprises heating, at between 200° C. and 300° C., a rosin-polyhydric alcohol ester with from 10% to 75% of an ester of a conjugated diene alpha-beta olefinic dicarboxylic acid adduct and a beta-unsaturated monohydric alcohol containing from 3 to 4 carbon atoms.

3. The process of making a soluble resinous reaction product which comprises heating, at between 200° C. and 300° C., a rosin-polyhydric alcohol ester formed from equivalent amounts of rosin acids and polyhydric alcohol with from 10% to 75% of a di-ester of a conjugated diene alpha-beta olefinic dicarboxylic acid adduct and a beta-unsaturated monohydric alcohol containing from 3 to 4 carbon atoms.

4. The process of making a soluble resinous reaction product which comprises heating, at between 200° C. and 300° C., a rosin-polyhydric alcohol ester formed from rosin acids and an excess of polyhydric alcohol, with from 10% to 75% of a mono-ester of a conjugated diene alpha-beta olefinic dicarboxylic acid adduct and a beta-unsaturated monohydric alcohol containing from 3 to 4 carbon atoms.

5. The process of claim 3 where the di-ester of the conjugated diene alpha-beta olefinic dicarboxylic acid adduct and unsaturated monohydric alcohol is diallyl 3,6-endomethylene 1,2,3,6-tetrahydrophthalate.

6. The process of claim 3 where the di-ester of the conjugated diene alpha-beta olefinic dicarboxylic acid adduct and unsaturated monohydric alcohol is diallyl 1,2,3,6-tetrahydrophthalate.

7. The process of claim 4 where the mono-ester of the conjugated diene alpha-beta olefinic dicarboxylic acid adduct and unsaturated monohydric alcohol is monoallyl 3,6-endomethylene 1,2,3,6-tetrahydrophthalate.

8. The process of making a soluble resinous reaction product which comprises heating, at between 200° C. and 300° C., glycerol triabietate with from 10% to 75% of diallyl 3,6-endomethylene-1,2,3,6-tetrahydrophthalate.

9. The process of making a soluble resinous reaction product which comprises heating, at between 200° C. and 300° C., glycerol triabietate with from 10% to 75% of diallyl 1,2,3,6-tetrahydrophthalate.

10. The process of making a soluble resinous reaction product which comprises heating, at between 200° C. and 300° C., glycerol diabietate with from 10% to 75% of monoallyl 3,6-endomethylene-1,2,3,6-tetrahydrophthalate.

11. A modified rosin ester adapted for use in coating compositions which comprises a heat-reaction product at between 200° C. and 300° C., of an abietic acid ester, with from 10% to 75% of an ester of a conjugated diene alpha-beta olefinic dicarboxylic acid adduct and a beta-unsaturated monohydric alcohol containing from 3 to 4 carbon atoms.

12. A soluble resinous reaction product which comprises the heat-reaction product at between 200° C. and 300° C., of a rosin-polyhydric alcohol ester with from 10% to 75% of an ester of a conjugated diene alpha-beta olefinic dicarboxylic acid adduct and a beta-unsaturated monohydric alcohol containing from 3 to 4 carbon atoms.

13. A soluble resinous reaction product which comprises the heat-reaction product, at between 200° C. and 300° C., of a rosin-polyhydric alcohol ester formed from equivalent amounts of rosin acids and polyhydric alcohol with from 10% to 75% of a diester of a conjugated diene alpha-beta olefinic dicarboxylic acid adduct and a beta-unsaturated monohydric alcohol containing from 3 to 4 carbon atoms.

14. A soluble resinous reaction product which comprises the heat-reaction product, at between 200° C. and 300° C. of a rosin-polyhydric alcohol ester formed from rosin acids and an excess of polyhydric alcohol, with from 10% to 75% of a monoester of a conjugated diene alpha-beta olefinic dicarboxylic acid adduct and a beta-unsaturated monohydric alcohol containing from 3 to 4 carbon atoms.

15. A soluble resinous reaction product obtained by heating glycerol triabietate with from 10% to 75% of diallyl 1,2,3,6-tetrahydrophthalate at a temperature of from 200° C. to 300° C.

16. A soluble resinous reaction product obtained by heating glycerol triabietate with from 10% to 75% of diallyl 3,6-endomethylene-1,2,3,6-tetrahydrophthalate at a temperature of from 200° C. to 300° C.

17. A soluble resinous reaction product obtained by heating glycerol diabietate with from 10% to 75% of monoallyl 3,6-endomethylene-1,2,3,6-tetrahydrophthalate at a temperature of from 200° C. to 300° C.

JOHN B. RUST.

REFERENCES CITED

The following references are of record in the file of this patent:

UNITED STATES PATENTS

| Number | Name | Date |
| --- | --- | --- |
| 1,860,730 | Brooks | May 31, 1932 |
| 2,221,663 | Rothrock | Nov. 12, 1940 |
| 2,398,668 | Rust | Apr. 16, 1946 |
| 2,398,669 | Rust | Apr. 16, 1946 |
| 2,409,633 | Kropa | Oct. 22, 1946 |

FOREIGN PATENTS

| Number | Country | Date |
| --- | --- | --- |
| 552,644 | Great Britain | Apr. 19, 1943 |